(12) United States Patent
Andree

(10) Patent No.: US 12,206,351 B2
(45) Date of Patent: Jan. 21, 2025

(54) ELECTRIC CIRCUIT FOR AN ELECTRIC MOTOR

(71) Applicant: GKN Sinter Metals Engineering GmbH, Radevormwald (DE)

(72) Inventor: Maurice Andree, Neukirchen-Vluyn (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 273 days.

(21) Appl. No.: 17/921,943

(22) PCT Filed: Apr. 27, 2021

(86) PCT No.: PCT/EP2021/061012
§ 371 (c)(1),
(2) Date: Oct. 27, 2022

(87) PCT Pub. No.: WO2021/219657
PCT Pub. Date: Nov. 4, 2021

(65) Prior Publication Data
US 2023/0188063 A1    Jun. 15, 2023

(30) Foreign Application Priority Data
Apr. 30, 2020  (DE) .................. 10 2020 111 778.7

(51) Int. Cl.
*H02P 25/00* (2006.01)
*H02K 1/14* (2006.01)
(Continued)

(52) U.S. Cl.
CPC .............. *H02P 6/085* (2013.01); *H02K 1/14* (2013.01); *H02K 1/2795* (2022.01); *H02K 17/12* (2013.01); *H02P 29/62* (2016.02)

(58) Field of Classification Search
CPC ........... H02P 6/185; H02P 29/62; H02K 1/14; H02K 17/12
(Continued)

(56) References Cited

U.S. PATENT DOCUMENTS

2011/0241584 A1*  10/2011  He .................. H02P 21/0089
                                                318/400.09
2013/0127280 A1*   5/2013  Sugimoto ............ H02K 1/02
                                                 310/156.01
(Continued)

FOREIGN PATENT DOCUMENTS

DE   102018111518 A1   11/2018
DE   102018104418 A1    6/2019
(Continued)

OTHER PUBLICATIONS

German Patent and Trademark Office, Office Action, Application No. 102020111778.7, Dec. 16, 2020, 7 pages [No English Language Translation Available].
(Continued)

*Primary Examiner* — Erick D Glass
(74) *Attorney, Agent, or Firm* — Quarles & Brady LLP

(57) ABSTRACT

An electric circuit for an electric motor. The electric motor having has at least one stator with at least three coils and a rotor with at least two magnetic poles. The motor is operable by the electric circuit at least in the following two states: a) in a first state, the coils can each be energized with different currents of a three-phase system and the rotor can be set into rotation about an axis of rotation; b) in a second state, the coils can be energized with an in-phase alternating current.

13 Claims, 3 Drawing Sheets

Figure 1:
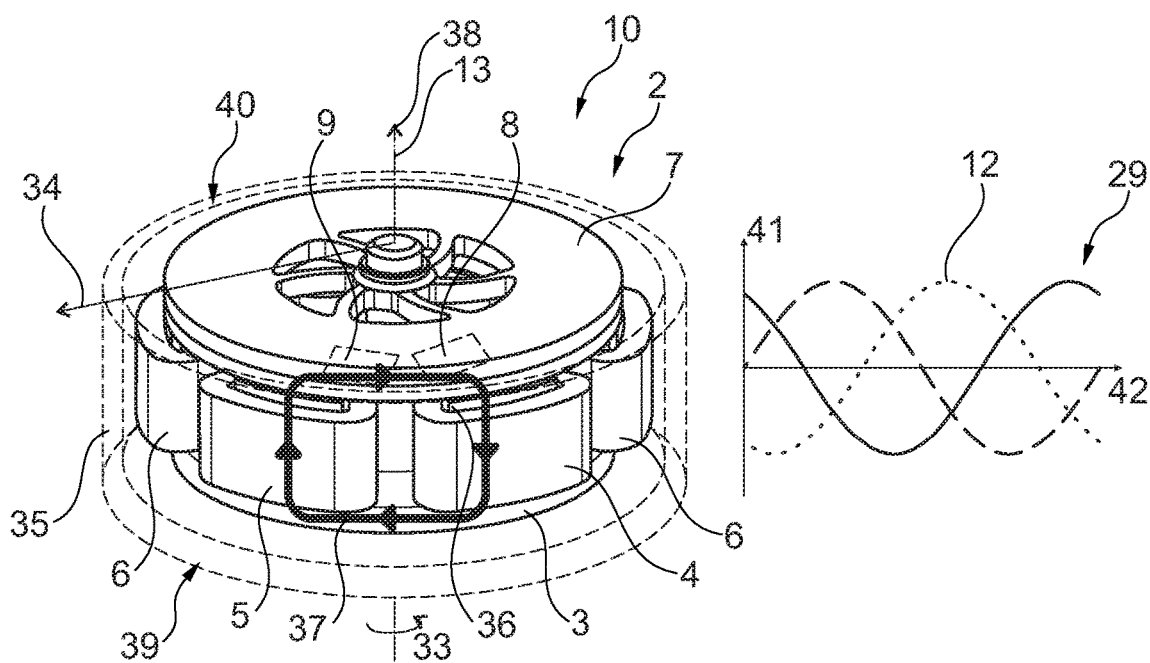

(51) Int. Cl.
  *H02K 1/2795*  (2022.01)
  *H02K 17/12*  (2006.01)
  *H02P 6/08*  (2016.01)
  *H02P 29/62*  (2016.01)

(58) Field of Classification Search
  USPC .................................................. 318/400.26
  See application file for complete search history.

(56) References Cited

U.S. PATENT DOCUMENTS

| | | | |
|---|---|---|---|
| 2013/0334937 A1* | 12/2013 | Yamada | ................. H02P 25/03 |
| | | | 310/68 D |
| 2018/0334043 A1 | 11/2018 | Zou et al. | |
| 2021/0017980 A1 | 1/2021 | Andree et al. | |

FOREIGN PATENT DOCUMENTS

| | | |
|---|---|---|
| EP | 2574520 A2 | 4/2013 |
| WO | 02071809 A1 | 9/2002 |
| WO | 2016066714 A2 | 5/2016 |
| WO | 2019170738 A1 | 9/2019 |

OTHER PUBLICATIONS

PCT International Search Report and Written Opinion, PCT/EP2021/061012, Jul. 12, 2021, 20 pages.

\* cited by examiner

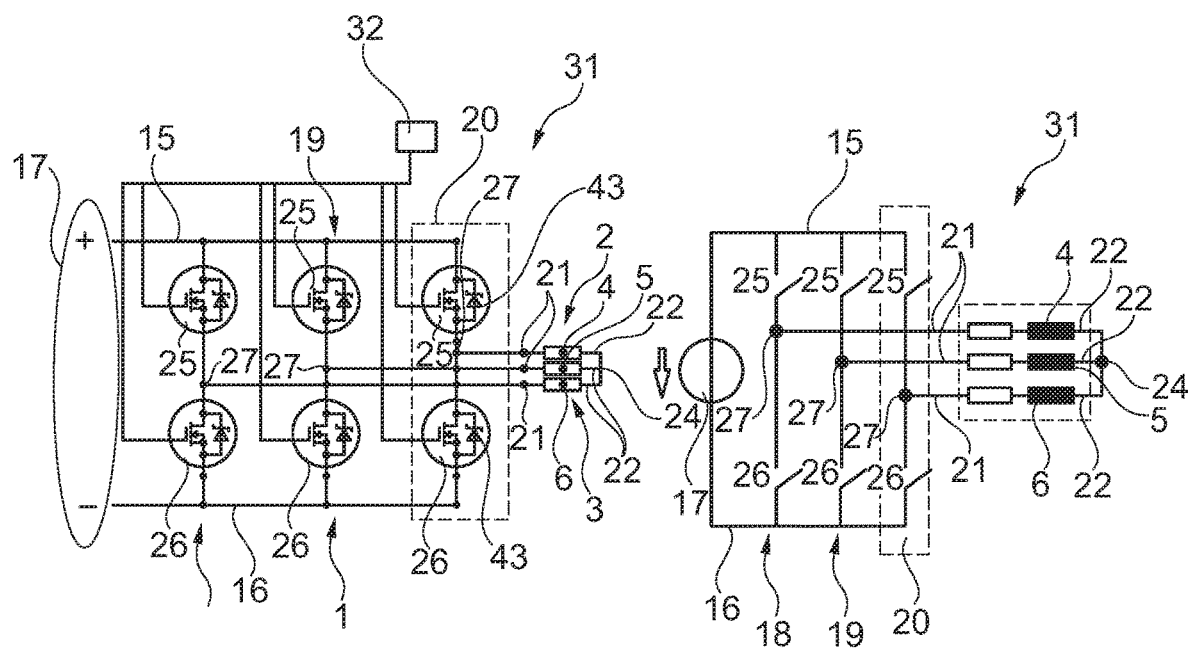
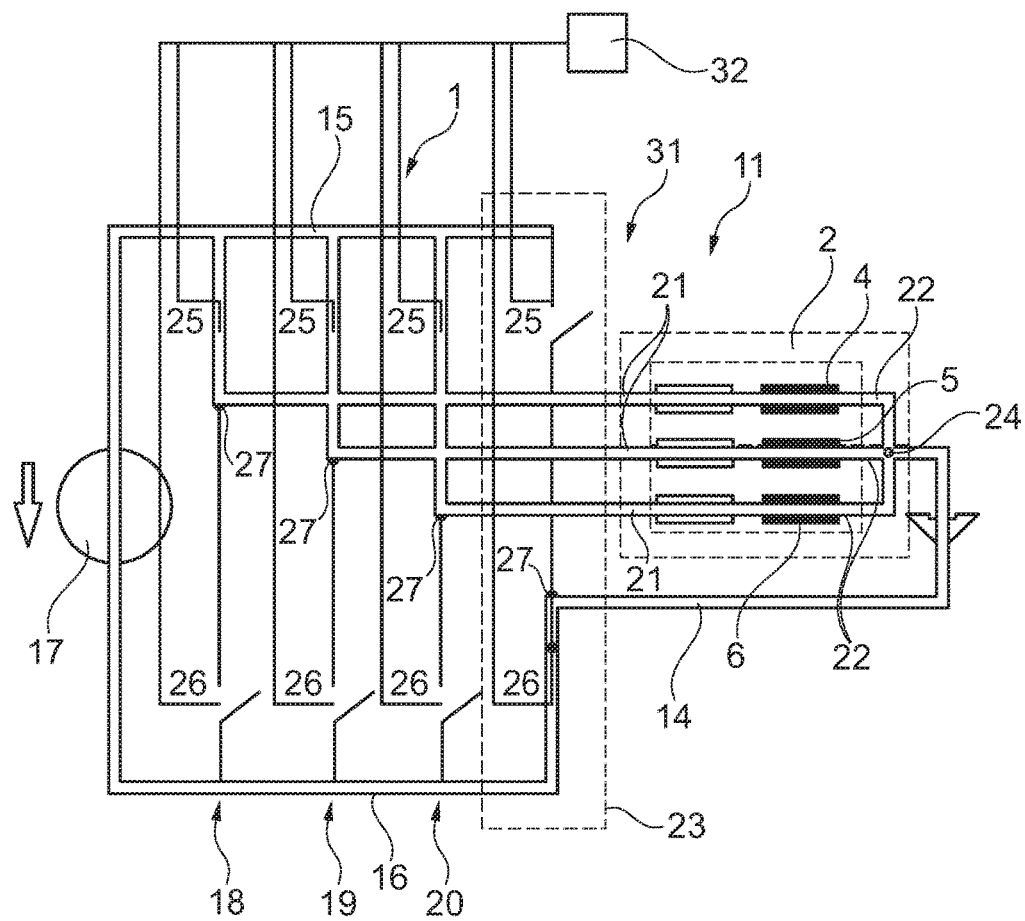

ELECTRIC CIRCUIT FOR AN ELECTRIC MOTOR

This application represents the U.S. national stage entry of International Application No. PCT/EP2021/061012 filed Apr. 27, 2021, which claims priority to German Patent Application No. 10 2020 111 778.7 filed Apr. 30, 2020, the disclosure of which is incorporated herein by reference in its entirety and for all purposes.

Applications are known in which, in addition to a drive power of an electric motor, it is also possible to use a heating power of the electric motor. For example, when conveying a urea/water solution (for example AdBlue) which is used to treat the exhaust gas, it may be desirable to heat the urea/water solution. The electric motor used to drive a pump also generates heat which can be used, for example, to defrost the urea/water solution.

WO 2019/170738 A1 discloses a method for operating an electric motor which can be operated in at least two states. In a first state, the coils are operated with respectively different electric currents of a three-phase system and the rotor is caused to rotate about an axis of rotation. In a second state, the coils are operated with an in-phase alternating current. The in-phase alternating current used in the second state makes it possible to deliberately heat components of a housing of the motor, for example.

Two different electric circuits which are separate from one another and can be operated independently of one another are usually used to produce these two states. This is considered to be necessary in order to comply with the different requirements with regard to the electric voltage and frequency provided.

In this case, for the first state, a low-frequency rotating field, for example of less than 1000 Hz [hertz], is produced, in particular, between the potential connections of the electric circuit. For the second state, it is necessary to produce a high-frequency in-phase alternating current, for example of at least 5 kHz, between the potential connections.

On the basis of this, the object of the present invention is to at least alleviate or even solve the problems described with respect to the prior art. In particular, the intention is to propose an electric circuit which can be used to operate an electric motor to deliberately generate a heating power.

In order to achieve these objects, an electric circuit according to the features of claim 1 is proposed. The dependent claims relate to advantageous developments. The features individually cited in the claims can be combined with one another in a technologically useful manner and can be supplemented with explanatory substantive matter from the description and details from the figures, where further embodiment variants of the invention are shown.

An electric circuit for an electric motor is proposed, wherein the electric motor has at least one first stator with at least three (or a multiple of three) coils and one rotor with at least two magnetic poles. The motor can be operated by the electric circuit at least in the following two states:
  a) in a first state, respectively different (electric) currents of a three-phase system (that is to say the individual currents are each offset by a phase angle with respect to one another) can be applied to the coils and the rotor can be caused to rotate about an axis of rotation;
  b) in a second state, an in-phase alternating current can be applied to the coils.

The electric circuit has at least one first potential connection and one second potential connection which can be connected or are connected to different potentials (for example positive pole and earth) of a DC voltage source.

The electric circuit comprises three half-bridges between the potential connections, wherein each coil can be connected or is connected in an electrically conductive manner to one half-bridge in each case via one first connection in each case and can be connected or is connected in an electrically conductive manner to the other coils via one second connection in each case. The electric circuit has a fourth half-bridge between the potential connections, which fourth half-bridge can be connected or is connected in an electrically conductive manner to a star point connecting the second connections.

The electric motor can also be operated as a generator, in particular. The statements made with respect to the motor accordingly apply to operation as a generator.

The stator and the rotor are arranged beside one another and coaxially with respect to one another, in particular along an axial direction. The coils are arranged beside one another along a circumferential direction (on a common diameter). An axial flux motor is therefore formed, in particular, in which the magnetic flux between the coils and the magnetic poles runs parallel to the axis of rotation along an axial direction. However, other designs of the electric motor are also possible, in particular, and can be used in combination with the electric circuit.

In particular, the electric motor is a BLDC, that is to say a brushless DC motor, in which the stationary stator comprises the coils and the rotatable rotor comprises permanent magnets.

In particular, the power consumption of the electric motor in the second state is effected (occasionally or in predefinable periods of time) solely to heat a body. The body is arranged, in particular, at a distance from the stator and the rotor.

In addition, a power consumption (occasionally or in predefinable periods of time) of the electric circuit can be additionally or exclusively effected to drive the rotor, such that the rotor rotates about an axis of rotation at a speed of more than zero ("0") revolutions per minute.

In the second state, (primarily or substantially only) a body is intended to be or can be heated by means of induction, in particular. The body may form, for example, a housing (or a part of the latter) of the electric motor. The body may form a line for a fluid, such that a fluid can be heated via the body. The body may be a shaft, for example. A pump set, of which the shaft is a constituent part, can be heated via a shaft, for example. A fluid to be conveyed by the pump set can therefore be heated via the shaft, for example.

During heating by means of induction, the heat is produced directly in the body itself, that is to say need not be transferred by heat conduction. The heating power can be controlled well. For inductive heating, a high-frequency (in-phase) alternating current is generated by the electric circuit and is applied to the stator, or a magnetic alternating field which generates eddy currents in the material of the body is generated in the coils of the stator. Inductive heating can also be carried out through non-conductive materials (for example a wall, a housing, etc.). The environment is heated only indirectly (in particular on account of heat radiation or conduction starting from the inductively heated body).

The stator of the electric motor has, in particular, a soft magnetic material, for example a so-called "soft magnetic composite" (SMC), or a combination of electric sheets and SMC. The coils of the stator comprise cores which are preferably produced from a soft magnetic material by pressing and baking. The SMC material is not sintered in this case. Rather, the temperature is controlled to below a melting temperature which suffices, however, for the cores to permanently retain their geometry.

The rotor has, in particular, permanent magnets and/or soft magnetic elements or magnetic poles, for example in recesses. A permanently excited synchronous or brushless DC motor, abbreviated to BLDC, can preferably be formed with permanent magnets, whereas a reluctance motor can be produced as an electric motor using soft magnetic elements, for example.

The structure of a stator, in particular using SMC, and further details also relating to a rotor are clear, for example, from WO 2016/066714 A1.

The electric motor has, in particular, an electric power consumption for the first state (that is to say a maximum drive power) of less than 1000 watts (nominal power), preferably of less than 500 watts, particularly preferably of less than 100 watts.

In particular, a power consumption of the electric motor is effected, on the one hand, to drive the rotor (first state), such that the rotor rotates about an axis of rotation at a speed of more than "0" revolutions per minute. On the other hand, a power consumption of the electric motor is effected to heat a body (second state).

In particular, the electric motor can be operated by the electric circuit in both states, with the result that the rotor is driven by the operation of the electric motor in the first state and, in a parallel manner in terms of time, a body is heated by the operation of the electric motor in the second state.

In a parallel manner in terms of time here means, in particular, that there is a changeover between the first state and the second state (in particular back and forth again and again) within an interval of time (for example one second), possibly for sub-intervals of the interval of time that are of different lengths.

The heating power transferred to the body is, in particular, the electric power [in watts] which is provided by the electric circuit during operation in the second state.

(Virtually) no electric power is preferably used to drive the rotor in the second state. In particular, despite a power consumption of the electric motor, the speed of the rotor is therefore "0" revolutions per minute.

In particular, the electric motor is not accelerated in the second state. That is to say, in particular, there may be a speed of greater than zero revolutions per minute of the rotor, but the rotor is not accelerated by the electric power which is used solely for conversion into heat.

A conventional electric circuit for driving an electric motor usually comprises a first potential connection and a second potential connection which can be connected to different potentials (for example positive pole and earth) of a DC voltage source, wherein three half-bridges are provided between the potential connections, wherein each coil of the electric motor can be connected in an electrically conductive manner to one half-bridge in each case via one first connection in each case and can be connected in an electrically conductive manner to the other coils via one second connection in each case.

The three half-bridges of the electric circuit make it possible to produce a three-phase system or multi-phase square-wave currents, wherein the phases are offset by 120 angular degrees with respect to one another. Each current or phase current is transferred to a coil or injected into a coil via one first connection in each case. The coils are connected to one another via second connections, wherein the different phase currents cancel one another out at the star point, with the result that there is no need for any separate or additional return conductor to the respective other potential connection.

In a known manner, a half-bridge comprises, in particular, an arrangement of an upper transistor and a lower transistor which are used to connect the potential connections to one another. A diode is connected in parallel with each transistor, in particular.

The supplementation of the known electric circuit with only one further half-bridge and the connection thereof to the star point results in an only slight increase in the size of the known electric circuit. In this case, however, this fourth half-bridge, and its advantageous arrangement, already makes it possible to additionally implement the second state.

In particular, each half-bridge has at least one upper transistor (high-side transistor) and one lower transistor (low-side transistor) which are connected to one another in an electrically conductive manner. The upper transistor is connected in an electrically conductive manner to the first potential connection and the lower transistor is connected in an electrically conductive manner to the second potential connection. Each half-bridge has a contact-connection between the upper transistor and the lower transistor, which contact-connection can be used to connect the respective one connection to the respective half-bridge.

Each first connection which is arranged on the electric motor, for example, is therefore connected in an electrically conductive manner to one of the first, second and third half-bridges in each case via the contact-connection. The second connections or the star point which is/are arranged on the electric motor, for example, is/are connected to the fourth half-bridge via the contact-connection.

In particular, in order to produce the second state, the electric circuit can be operated in such a manner that, on the one hand (in a first circuit state), the upper transistors of the first half-bridge, of the second half-bridge and of the third half-bridge synchronously (that is to say in a parallel manner in terms of time) connect the first potential connection to the respective first connection in an electrically conductive manner, while the lower transistors of these half-bridges (electrically) disconnect the respective first connections from the second potential connection. In sync with this, the lower transistor of the fourth half-bridge connects the second connection to the second potential connection in an electrically conductive manner. On the other hand (in a second circuit state), the lower transistors of the first half-bridge, of the second half-bridge and of the third half-bridge synchronously connect the second potential connection to the respective first connection in an electrically conductive manner, while the upper transistors of these half-bridges (electrically) disconnect the respective first connections from the first potential connection. In sync with this, the upper transistor of the fourth half-bridge connects the second connection to the first potential connection in an electrically conductive manner. If an in-phase current is therefore intended to be present during heating operation (second state), all first connections are at the same potential. In this case, a potential difference can be generated only by adding an additional return conductor, here via the fourth half-bridge.

These circuit states are implemented in temporal succession, in particular.

In these circuit states of the second state, the star point is connected in an electrically conductive manner to one potential connection in each case via the fourth half-bridge, with the result that there is an electric potential difference at each coil in both circuit states. Since the upper or the lower transistors of the first, second and third half-bridges switch at the same time and in an identical manner, there is only a single-phase current. An alternating current is generated by changing between the circuit states.

In particular, the electric circuit comprises at least one capacitor which can be used to connect the star point to the fourth half-bridge. The capacitor is arranged between the star point and the fourth half-bridge during operation of the electric motor.

The at least one capacitor is arranged, in particular, in a series circuit between the electric motor and the fourth half-bridge.

Alternatively, the at least one capacitor is arranged in a parallel circuit between the first connection and the second connection. In particular, one or more compensation capacitors are connected in parallel for each phase, in particular in each case between a first and a second connection of the coil(s) which are interconnected to form a phase. In this case, it should be noted that, if the PWM signal which is used to generate the current form in the first state has a similar frequency to the heating frequency, a current smoothing effect of the motor inductance is annulled and it is therefore no longer possible to specifically generate the current form. In order to circumvent this problem, the PWM frequency and the heating frequency should be far apart.

In particular, a capacitance of the at least one capacitor is selected on the basis of an inductance of the coils of the motor, such that a reactive power can be at least partially compensated for during operation of the motor.

Without the at least one capacitor, the heating power which can be produced, for example in low-voltage systems, for example in automotive applications, could be achieved only to a limited extent, in particular, since the coil current is limited at high frequencies of the alternating current on account of the high impedance of the coils. In this case, the impedance of a coil increases proportionally with the frequency according to $Z=j2\pi f\,L$, where Z: impedance of a coil
j: imaginary unit
f: frequency of the alternating current
L: inductance of the coil Since the connection potentials of the electric circuit are connected to a DC voltage source (to a sink during generator operation), an accordingly high voltage would have to be provided thereby. However, this cannot be achieved, in particular in automotive applications with low vehicle electric system voltages. In particular, reactive power can be compensated for by reaching a state of resonance by arranging the at least one capacitor. In this case, the required voltage between the potential connections can also be generated with a considerably lower DC voltage.

The winding section voltage of the electric motor that is dropped across a coil can generally be determined by multiplying the coil impedance by the phase current:

$$\underline{U}=\underline{Z}\cdot\underline{I}$$

In this case, the coil impedance can always be described by a frequency-independent real part and a frequency-dependent imaginary part. A complicated relationship between the current and voltage emerges taking into account parasitic components and further frequency-dependent effects and loss mechanisms. However, the impedance may be represented to a good approximation as a simplified relationship for both states. In the first state, the non-reactive wire resistance of a coil winding section forms the real part of the impedance, while the inductive behaviour can be expressed by the imaginary part of the impedance. The winding section voltage (voltage between the first connection and the second connection, that is to say voltage dropped across a coil) can be calculated for this first state by means of the following formula:

$$\underline{U}=\underline{I}\cdot(R_i+j2\pi f L_i),\text{ where}$$

$\underline{U}$: winding section voltage, that is to say voltage between the potential connection respectively connected in an electrically conductive manner via the first connections and the second connection
$\underline{I}$: electric current applied to the electric motor;
$R_i$: resistance of the respective coil or of the current path running through the coil
j: imaginary unit
f: frequency of the alternating current
$L_i$: inductance of the respective coil For the second state, in contrast, this description of the coil impedance is not sufficient, in particular. The iron losses produced in the body should be taken into account more precisely. The coil or the magnetic circuit becomes lossy, thus making it possible to define an additional component in the real part, to which the active power losses produced in the body can be attributed. On account of the in-phase condition, the motor winding sections can be considered to be a parallel circuit in this state, with the result that the winding section voltage for the second state can be expressed to a good approximation by the following equation:

$$\underline{U}=\underline{I}\cdot\left(\frac{R_i}{3}+R_v+j2\pi f\frac{L_i}{3}\right),$$

where
$R_v$: resistance for describing the loss component in the second state

The arrangement of the at least one capacitor changes the above-mentioned equation as follows:

$$\underline{U}=\underline{I}\cdot\left[\frac{R_i}{3}+R_v+j\left(2\pi f\frac{L_i}{3}-\frac{1}{2\pi fC}\right)\right],$$

where
C: capacitance of the at least one capacitor

In this case, the capacitance of the at least one capacitor should be selected such that:

$$2\pi f\frac{L_i}{3}=\frac{1}{2\pi fC}$$

The imaginary and frequency-dependent component can therefore be compensated for completely, in particular, and the voltage requirement can be drastically reduced, such that:

$$\underline{U}=\underline{I}\cdot\left(\frac{R_i}{3}+R_v\right)$$

On account of the high winding section voltage of the electric motor, that is to say the voltage between the first connections and the second connections, a sufficiently high dielectric strength and an ESR (equivalent series resistance) which is as low as possible should be taken into account when dimensioning the at least one capacitor in order to reduce the compensation losses. Furthermore, frequency stability on the basis of a temperature should be ensured since, for example, capacitors experience a change in their capacitance on the basis of a temperature, but cores of the coils can also behave in a temperature-dependent manner. If the state of resonance is detuned, that is to say the capacitance changes with the temperature, for example, a different frequency is needed to maximize the power loss. In this case, the frequency can be readjusted using a control unit, for example a microprocessor. A measurement of the current, for example using shunt resistors (generally low-side shunts), can be used to maximize the current and therefore the losses. A current can therefore be measured and a frequency can be adjusted, in particular alternately, in which case these steps can be repeated multiple times.

A method for operating an electric motor using the electric circuit described is also proposed. In order to produce the first state, the motor is operated solely via the first half-bridge, the second half-bridge and the third half-bridge.

In particular, the star point is connected only to one potential connection in an electrically conductive manner via the fourth half-bridge or is (electrically) disconnected from both potential connections (that is to say is arranged in a floating manner) during the first state.

In particular, each half-bridge has at least one upper transistor and one lower transistor which are connected to one another in an electrically conductive manner; wherein the upper transistor is connected to the first potential connection in an electrically conductive manner and the lower transistor is connected to the second potential connection in an electrically conductive manner. Each half-bridge has a contact-connection between the upper transistor and the lower transistor, which contact-connection is used to connect the respective one connection to the respective half-bridge. In order to produce the second state:

on the one hand, the upper transistors of the first half-bridge, of the second half-bridge and of the third half-bridge are synchronously switched and the first potential connection is connected to the respective first connection in an electrically conductive manner, while the lower transistors of these half-bridges (are synchronously switched and) disconnect the respective first connections from the second potential connection; wherein, in sync with this, the lower transistor of the fourth half-bridge is switched for the purpose of connecting the second connection to the second potential connection; and on the other hand, the lower transistors of the first half-bridge, of the second half-bridge and of the third half-bridge are synchronously switched and the second potential connection is connected to the respective first connection in an electrically conductive manner, while the upper transistors of these half-bridges (are synchronously switched and) disconnect the respective first connections from the first potential connection; wherein, in sync with this, the upper transistor of the fourth half-bridge is switched for the purpose of connecting the second connection to the first potential connection.

In a known manner, the three-phase system of the first state is produced by switching the first, second and third half-bridges in a controlled manner.

In particular, a first frequency of the three-phase system is at most 50%, preferably at most 10%, particularly preferably at most 2%, of a second frequency of the alternating current.

The first frequency of the three-phase system (that is to say the number of periods of a phase of the three-phase system for each second) is, in particular, at most 1000 Hz, in particular at most 500 Hz.

The second frequency of the alternating current (where there are two potential changes for each period) is, in particular, at least 5 kHz, preferably at least 10 kHz, particularly preferably at least 15 kHz.

In particular, a maximum heating power that can be produced by the electric circuit in the second state is at least 50%, preferably at least 100%, particularly preferably at least 200%, of a drive power that can be produced by the electric circuit in the first state.

In particular, a maximum heating power that can be produced by the electric circuit in the second state is higher than a drive power that can be produced by the electric circuit in the first state by a factor of at least five, preferably at least 10, particularly preferably at least 25 or even at least 45.

If an electric power consumption for the first state (that is to say a maximum drive power) is therefore up to 1000 watts (nominal power), a power consumption for the second state may be at least up to 5 kW [kilowatts], 10 kW, 25 kW or even 45 kW.

In particular, the electric circuit is operated either to produce the first state or to produce the second state in intervals of time which differ from one another.

In particular, there is a changeover between the intervals of time at a third frequency of more than one ("1") Hz, in particular of more than 5 Hz, preferably of more than 20 Hz and particularly preferably of more than 100 Hz.

In particular, the intervals of time assigned to the respective state may be of different lengths. In particular, first intervals of time in which the motor is operated in the first state are longer, for example by at least 10%, at least 20% or at least 40%, than second intervals of time in which the motor is operated in the second state.

In particular, the proportions of time in which a motor is operated in the first state or in the second state may thus be different.

In particular, first intervals of time and/or second intervals of time may be of different lengths.

In particular, different electric powers may be provided in different first and/or second intervals of time.

In particular, different electric parameters, for example frequency, current, etc., may be present in different first and/or second intervals of time.

A motor arrangement is also proposed, at least comprising an electric motor which has at least one stator with at least three coils and one rotor with at least two magnetic poles, the electric circuit described and a control device for controlling the electric circuit such that the motor can be operated with the method described.

The control device is equipped, configured or programmed, in particular, such that the electric circuit can be operated according to the method described.

An electrically conductive body is preferably arranged in a radial direction at least inside or outside at least the stator and is heated by means of induction at least during operation of the electric motor in the second state.

Alternatively or additionally, the body may be the rotor. For this purpose, in addition to the magnetic poles, the rotor has a carrier material which is referred to as a body.

In particular, a first electric resistivity [ohms*millimetres2/metre] of the body is lower than a second electric resistivity of a core of a coil.

In particular, the SMC material used for the core has a high electric resistivity. In particular, the body (for example produced from steel) has a lower electric resistivity (than the material used for the core).

In particular, the body, in particular, is used to convert the electric power provided in the second state into heat. The body preferably has a high electric and/or magnetic conductivity and contains iron, with the result that effective heating is possible. In particular, the core of a coil has a considerably lower electric conductivity than the body, with the result that eddy currents are suppressed in the core. With regard to the magnetic conductivity, the body and the core may be identical or similar, in particular.

In particular, a first electric resistivity is lower than a second electric resistivity by a factor of at least two, preferably at least five, particularly preferably at least 10.

In particular, each coil of the stator has a core which extends from a first end to a second end of the at least one stator (in particular parallel to the axial direction), wherein the rotor is arranged adjacent to the at least one second end.

The body extends, in particular, along a circumferential direction fully (in a radial direction inside or outside the cores or the coils) and along an axial direction (and the axis of rotation running parallel thereto) to the at least one first end of the core.

The body preferably makes contact with the cores of the coils at the at least one first end.

In particular, the magnetic flux is conducted via the body such that the highest possible proportion of the electric power of the electric motor can be converted into heat by the body.

In particular, the body extends from an end face of the rotor facing away from the first stator, along the axial direction and in a radial direction inside or outside the coils, to the first end.

In particular, the body extends at the at least one first end along the radial direction to at least over the extent of the cores.

In particular, the body extends at the second end along the radial direction and along the end face of the rotor facing away from the first stator to at least over the extent of the cores (in alignment above the rotor).

In particular, a pump for conveying a fluid can be driven via the electric motor, wherein the pump (for conveying the fluid) is operated in the first state and at least the fluid which can be conveyed by the pump is heated in the second state.

In the second state, the coils are operated with an in-phase alternating current. There is then no multi-phase current, in particular, with the result that the rotor is currently not driven. An alternating magnetic field which can produce heat in the body via induction is generated via the alternating current.

The statements made with respect to the electric circuit likewise apply to the method and the motor arrangement and vice versa.

An electric circuit is therefore proposed, with which an electric power for an electric motor is used, on the one hand, to drive a rotor (that is to say to carry out a rotational movement) and, on the other hand, to specifically heat a body by means of induction. In this case, the body may also be exclusively heated and the rotor may not be driven at all. This is advantageous, in particular, for fluids which can freeze, for example urea/water solutions which have a freezing point of approximately −11° C. By virtue of the body, a fluid stored in a tank can therefore be defrosted and can then be increasingly conveyed.

The use of indefinite articles ("a", "an", "of a" and "of an"), in particular in the claims and the description describing the latter, should be understood as such and not as a numeral. Accordingly, terms or components introduced therewith should therefore be understood as meaning that they are present at least once and, in particular, may also be present multiple times.

As a precaution, it should be noted that the numerals used here ("first", "second", . . . ) are used primarily (only) to distinguish a plurality of identical objects, variables or processes, that is to say do not necessarily specify, in particular, any dependence and/or order of these objects, variables or processes with respect to one another. Should a dependence and/or order be required, this is explicitly stated here or it is obvious to a person skilled in the art upon studying the specifically described configuration. If a component can occur multiple times ("at least one"), the description for one of these components may equally apply to all or some of the plurality of these components, but this is not necessary.

Figure 2:
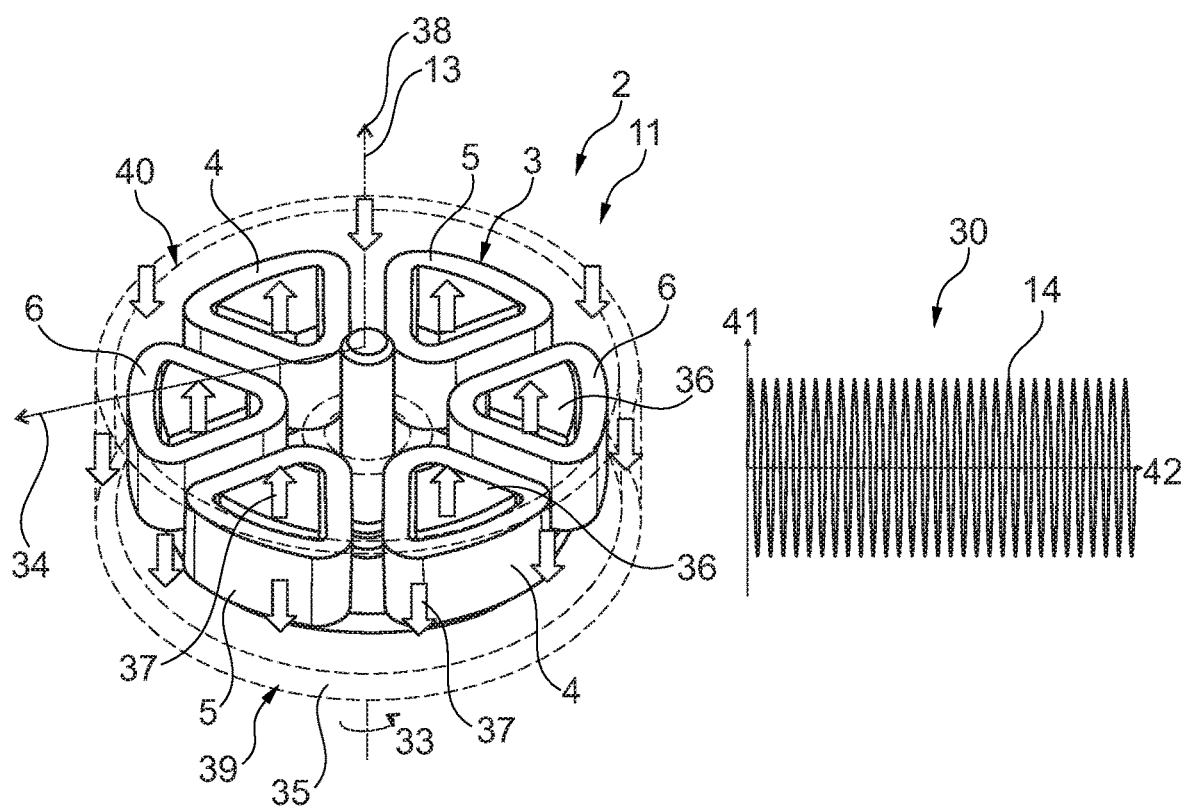

The invention and the technical environment are explained in more detail below on the basis of the accompanying figures. It should be pointed out that the invention is not intended to be restricted by the exemplary embodiments stated. In particular, unless explicitly described otherwise, it is also possible to extract partial aspects of the substantive matter explained in the figures and to combine them with other constituent parts and knowledge from the present description. In particular, it should be pointed out that the figures and, in particular, the proportions illustrated are only schematic. In the figures:

FIG. 1: shows a perspective view of an electric motor, operated in a first state;

FIG. 2: shows a perspective view of a part of the electric motor according to FIG. 1, operated in a second state;

FIG. 3: shows a first illustration of a known motor arrangement;

FIG. 4: shows a second illustration of the motor arrangement according to

Figure 6:
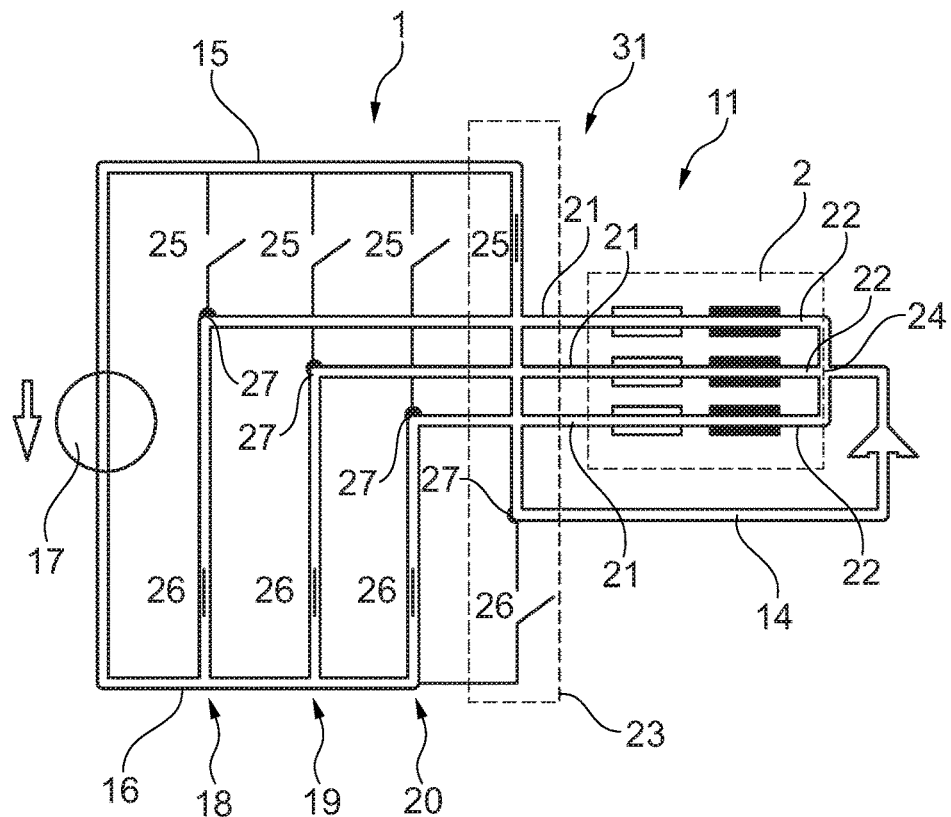
Figure 7:
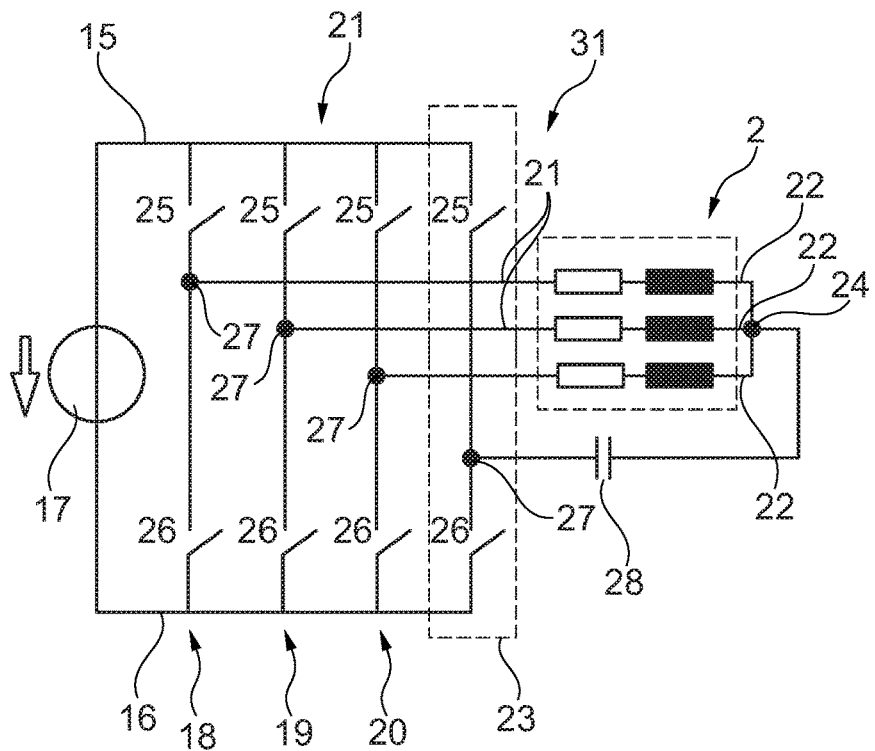

FIG. 3;

FIG. 5: shows a motor arrangement in a first switching state of the second state;

FIG. 6: shows the motor arrangement according to FIG. 5 in a second switching state of the second state;

FIG. 7: shows a further embodiment variant of a motor arrangement.

FIG. 1 shows a perspective view of an electric motor 2, operated in a first state 10. The electric motor 2 comprises a stator 3 and a rotor 7. The electric motor 2 is an axial flux motor, wherein the stator 3 and the rotor 7 are arranged coaxially with respect to one another and beside one another along an axial direction 38. Along the circumferential direction 33, the rotor 7 alternately has first magnetic poles 8 and second magnetic poles 9 (not illustrated in detail). The stator 3 has six cores 36 which extend along the axial direction 38 or the axis of rotation 13. One coil 4, 5, 6 is respectively arranged on each core 36. Each coil 4, 5, 6 is connected to an electric circuit 1 (see FIGS. 3 to 7) in an electrically conductive manner. The coils 4, 5, 6 are arranged in the following order along the circumferential direction 33: first coil 4, second coil 5, third coil 6, first coil 4 etc.

Each core 36 extends from a first end 39 of the stator 3 to a second end 40 of the stator 3, wherein the rotor 7 is arranged adjacent to the second end 40.

A part of the housing of the electric motor 2 here forms a body 35. The body 35 extends along a circumferential direction 33 fully (in a radial direction 34 outside the cores 36 or the coils 4, 5, 6) and along an axial direction 38 (and the axis of rotation 13 running parallel thereto) from the second end 40 of the stator 3 to the first end 39 of the stator 3. The body 35 makes contact with the cores 36 of the coils 4, 5, 6 at the first end 39 of the stator 3. The body 35 extends at the first end 39 along the radial direction 34 to over the extent of the cores 36. The body 35 here forms a pot with a cylindrical section (from the second end 40 to the first end 39) and a base (at the first end 39).

FIG. 1 illustrates the magnetic flux 37 at least for two coils 4, 5, which magnetic flux arises when the electric motor 2 is energized according to the first state 10. The profiles of the individual phases of the three-phase system 12 are illustrated in the graph in FIG. 1. The current intensity 41 is plotted on the vertical axis. The phase angle 42 is plotted on the horizontal axis. It can be seen that the first frequency 29 of the three-phase system 12 is lower by a multiple than the second frequency 30 plotted on a similar but different scale according to FIG. 2.

FIG. 2 shows a perspective view of a part of the electric motor 2 according to FIG. 1, operated in a second state 11. Reference is made to the statements made with respect to FIG. 1.

The rotor 7 is not illustrated here. Furthermore, the magnetic flux 37 which arises when the electric motor 2 is operated according to the second state 11 is illustrated here.

In the second state 11, an in-phase alternating current is applied to the coils 4, 5, 6. There is then no multi-phase current, with the result that the rotor 7 is currently not driven. An alternating magnetic field is generated via the alternating current. The change in the magnetic flux 37 (dB/dt) generated by the magnetic field is linked to an electric vortex field (rotE). On account of the quick change in the magnetic flux 37, an eddy current density which is finally responsible for or causes the generation of heat in the body 35 is produced in the body 35.

The magnetic flux 37 is conducted via the body 35 such that the highest possible proportion of the electric power of the electric motor 2 can be converted into heat by the body 35. The body 35 conducts the magnetic flux 37 from the second end 40 along the axial direction 38 to the first end 39 and into the cores 36 again.

The graph in FIG. 2 illustrates the profile of the alternating current 14 which is the same for all coils 4, 5, 6. The current intensity 41 is plotted on the vertical axis. The phase angle 42 is plotted on the horizontal axis. It can be seen that the second frequency 30 of the alternating current 14 is higher by a multiple than the first frequency 29 plotted on a similar but different scale according to FIG. 1.

FIG. 3 shows a first illustration of a known motor arrangement 31. FIG. 4 shows a second illustration of the motor arrangement 31 according to FIG. 3. FIGS. 3 and 4 are described together below. Reference is made to the statements made with respect to FIGS. 1 and 2.

The motor arrangement 31 comprises an electric motor 2 which has a stator 3 with three coils 4, 5, 6 and a rotor 7 (not illustrated), an electric circuit 1 and a control device 32 (see FIG. 3) for controlling the electric circuit 1 such that the motor 2 can be operated via the electric circuit 1.

The known electric circuit 1 for driving an electric motor 2 comprises a first potential connection 15 and a second potential connection 16 which are connected to different potentials (for example positive pole and earth) of a DC voltage source 17, wherein three half-bridges 18, 19, 20 are provided between the potential connections 15, 16, wherein each coil 4, 5, 6 of the electric motor 2 is connected in an electrically conductive manner to one half-bridge 18, 19, 20 in each case via one first connection 21 in each case and is connected in an electrically conductive manner to the other coils 4, 5, 6 via one second connection 22 in each case.

The three half-bridges 18, 19, 20 of the electric circuit 1 make it possible to produce a three-phase system 12, wherein the phases are offset by 120 angular degrees with respect to one another. Each phase is transmitted to a coil 4, 5, 6 via one first connection 21 in each case. The coils 4, 5, 6 are connected to one another via second connections 22, wherein the different phase currents cancel one another out at the star point 24, with the result that there is no need for a return conductor to the respective other potential connection 16, 15.

In a known manner, a half-bridge 18, 19, 20 comprises, in particular, an arrangement of an upper transistor 25 and a lower transistor 26 which are used to connect the potential connections 15, 16 to one another. A diode 43 is connected in parallel with each transistor 25, 26. The first connections 21 are connected in an electrically conductive manner to the respective half-bridge 18, 19, 20 via contact-connections 27.

In the illustration in FIG. 4, the transistors 25, 26 and diodes 43 are illustrated in a simplified manner as switches and are referred to as transistors 25, 26. Each coil is formed by an electric resistance R and an electric inductance L.

FIG. 5 shows a motor arrangement 31 in a first switching state of the second state 11. FIG. 6 shows a motor arrangement 31 in a second switching state of the second state 11. FIGS. 5 and 6 are described together below. Reference is made to the statements made with respect to FIGS. 3 and 4 and, in particular, the statements made with respect to the simplified illustration of the half-bridges 18, 19, 20 according to FIG. 4.

In contrast to the motor arrangements 31 according to FIGS. 3 and 4, the electric circuit 1 here has a fourth half-bridge 23 between the potential connections 15, 16, which fourth half-bridge can be connected in an electrically conductive manner to a star point 24 connecting the second connections 22.

The supplementation of the known electric circuit 1 with only one further half-bridge 23 and its connection to the star point 24 results in an only slight increase in the size of the known electric circuit 1 according to FIGS. 3 and 4. In this case, however, this fourth half-bridge 23, and its advantageous arrangement, already makes it possible to additionally implement the second state 11.

Each half-bridge 18, 19, 20, 23 has at least one upper transistor 25 (high-side transistor) and one lower transistor 26 (low-side transistor) which are connected to one another in an electrically conductive manner. The upper transistor 25 is connected to the first potential connection 15 in an electrically conductive manner and the lower transistor 26 is connected to the second potential connection 16 in an electrically conductive manner. Each half-bridge 18, 19, 20, 23 has a contact-connection 27 between the upper transistor 25 and the lower transistor 26, which contact-connection can be used to connect the respective one connection 21, 22 to the respective half-bridge 18, 19, 20, 23.

Each first connection 21 which is arranged on the electric motor 2 is therefore connected in an electrically conductive manner to one of the first, second and third half-bridges 18, 19, 20 in each case via the contact-connection 27. The second connections 22 or the star point 24 which is/are arranged on the electric motor 2 is/are connected to the fourth half-bridge 23 via the contact-connection 27.

For the purpose of producing the second state 11, the electric circuit 1 can be operated in such a manner that, on the one hand (in a first circuit state, see FIG. 5), the upper transistors 25 of the first half-bridge 18, of the second half-bridge 19 and of the third half-bridge 20 synchronously (that is to say in a parallel manner in terms of time) connect the first potential connection 15 to the respective first connection 21 in an electrically conductive manner, while the lower transistors 26 of these half-bridges 18, 19, 20 (electrically) disconnect the respective first connections 21 from the second potential connection 16. In sync with this, the lower transistor 26 of the fourth half-bridge 23 connects the second connection 22 to the second potential connection 16 in an electrically conductive manner. On the other hand (in a second circuit state, see FIG. 6), the lower transistors 26 of the first half-bridge 18, of the second half-bridge 19 and of the third half-bridge 20 synchronously connect the second potential connection 16 to the respective first connection 21 in an electrically conductive manner, while the upper transistors 25 of these half-bridges 18, 19, 20 (electrically) disconnect the respective first connections 21 from the first potential connection 15. In sync with this, the upper transistor 25 of the fourth half-bridge 23 connects the second connection 22 to the first potential connection 15 in an electrically conductive manner.

These circuit states are implemented in temporal succession.

In these circuit states of the second state 11, the star point 24 is connected in an electrically conductive manner to one potential connection 15, 16 in each case via the fourth half-bridge 23, with the result that an electric potential is present at each coil 4, 5, 6 in both circuit states. Since the upper or lower transistors 25, 26 of the first, second and third half-bridges 18, 19, 20 switch at the same time and in the same manner, there is only a single-phase current. An alternating current 14 is generated by changing between the circuit states.

FIG. 7 shows a further embodiment variant of a motor arrangement 31. Reference is made to the statements made with respect to FIGS. 5 and 6.

In contrast to FIGS. 5 and 6, the electric circuit 1 comprises a capacitor 28 which is used to connect the star point 24 to the fourth half-bridge 23. The capacitor 28 is arranged between the star point 24 and the fourth half-bridge 23 during operation of the electric motor 2. The capacitor 28 is arranged in a series circuit between the electric motor 2 and the fourth half-bridge 23.

A capacitance of the capacitor 28 is selected on the basis of an inductance of the coils 4, 5, 6 of the motor 2, with the result that a reactive power can be at least partially, preferably (virtually) completely, compensated for during operation of the motor 2.

LIST OF REFERENCE SIGNS

1 Electric circuit
2 Motor
3 Stator
4 First coil
5 Second coil
6 Third coil
7 Rotor
8 First magnetic pole
9 Second magnetic pole
10 First state
11 Second state
12 Three-phase system
13 Axis of rotation
14 Alternating current
15 First potential connection
16 Second potential connection
17 DC voltage source
18 First half-bridge
19 Second half-bridge
20 Third half-bridge
21 First connection
22 Second connection
23 Fourth half-bridge
24 Star point
25 Upper transistor
26 Lower transistor
27 Contact-connection
28 Capacitor
29 First frequency
30 Second frequency
31 Motor arrangement
32 Control device
33 Circumferential direction
34 Radial direction
35 Body
36 Core
37 Magnetic flux
38 Axial direction
39 First end
40 Second end
41 Current intensity
42 Phase angle
43 Diode

The invention claimed is:

1. An electric circuit for an electric motor, wherein the electric motor has at least one stator with at least three coils and one rotor with at least two magnetic poles; wherein the motor is operable by the electric circuit at least in the following two states:
   a) in a first state, respectively different currents of a three-phase system can be applied to the coils and the rotor can be caused to rotate about an axis of rotation;
   b) in a second state, an in-phase alternating current can be applied to the coils;
   wherein the electric circuit has at least one first potential connection and one second potential connection which can be connected to different potentials of a DC voltage source, wherein the electric circuit comprises three half-bridges between the potential connections, wherein each coil can be connected in an electrically conductive manner to one half-bridge in each case via one first connection in each case and can be connected in an electrically conductive manner to the other coils via one second connection in each case; wherein the electric circuit has a fourth half-bridge between the potential connections, which fourth half-bridge can be connected in an electrically conductive manner to a star point connecting the second connections.

2. The electric circuit according to claim 1, wherein each half-bridge has at least one upper transistor and one lower transistor which are connected to one another in an electrically conductive manner; wherein the upper transistor is connected in an electrically conductive manner to the first potential connection and the lower transistor is connected in an electrically conductive manner to the second potential connection; wherein each half-bridge has a contact-connection between the upper transistor and the lower transistor, which contact-connection can be used to connect the respective one connection to the respective half-bridge.

3. The electric circuit according to claim 2, which, in order to produce the second state, can be operated in such a manner that, on the one hand, the upper transistors of the first half-bridge, of the second half-bridge and of the third half-bridge synchronously connect the first potential connection to the respective first connection in an electrically conductive manner, while the lower transistors of these half-bridges disconnect the respective first connections from the second potential connection; wherein, in sync with this, the lower transistor of the fourth half-bridge connects the second connection to the second potential connection in an electrically conductive manner; and that, on the other hand, the lower transistors of the first half-bridge, of the second half-bridge and of the third half-bridge synchronously connect the second potential connection to the respective first connection in an electrically conductive manner, while the upper transistors of these half-bridges-disconnect the respective first connections from the first potential connection; wherein, in sync with this, the upper transistor of the fourth half-bridge connects the second connection to the first potential connection in an electrically conductive manner.

4. The electric circuit according to one of the preceding claim 1, having at least one capacitor which can be used to connect the star point to the fourth half-bridge.

5. The electric circuit according to claim 4, wherein a capacitance of the at least one capacitor is selected on the basis of an inductance of the coils of the motor, such that a reactive power can be at least partially compensated for during operation of the motor.

6. A method for operating an electric motor-using an electric circuit according to claim 1, wherein, in order to produce the first state, the motor is operated solely via the first half-bridge, the second half-bridge and the third half-bridge.

7. The method according to claim 6, wherein the star point is connected only to one potential connection in an electrically conductive manner via the fourth half-bridge or is disconnected from both potential connections during the first state.

8. The method according to claim 6, wherein each half-bridge has at least one upper transistor and one lower transistor-which are connected to one another in an electrically conductive manner; wherein the upper transistor is connected to the first potential connection in an electrically conductive manner and the lower transistor is connected to the second potential connection in an electrically conductive manner; wherein each half-bridge has a contact-connection-between the upper transistor and the lower transistor, which contact-connection is used to connect the respective one connection to the respective half-bridge; wherein, in order to produce the second state, on the one hand, the upper transistors of the first half-bridge, of the second half-bridge and of the third half-bridge are synchronously switched and connect the first potential connection to the respective first connection in an electrically conductive manner, while the lower transistors of these half-bridges disconnect the respective first connections from the second potential connection; wherein, in sync with this, the lower transistor of the fourth half-bridge is switched for the purpose of connecting the second connection to the second potential connection; and on the other hand, the lower transistors of the first half-bridge, of the second half-bridge and of the third half-bridge are synchronously switched and connect the second potential connection to the respective first connection in an electrically conductive manner, while the upper transistors of these half-bridges disconnect the respective first connections from the first potential connection; wherein, in sync with this, the upper transistor of the fourth half-bridge is switched for the purpose of connecting the second connection to the first potential connection.

9. The method according to claim 6, wherein a first frequency of the three-phase current is at most 50% of a second frequency of the alternating current.

10. The method according to claim 6, wherein a maximum heating power that can be produced by the electric circuit in the second state is at least 50% of a drive power that can be produced by the electric circuit in the first state.

11. The method according to claim 6, wherein the electric circuit is operated either to produce the first state or to produce the second state in intervals of time which differ from one another.

12. The method according to claim 11, wherein there is a changeover between the intervals of time at a third frequency of more than one Hz.

13. A motor arrangement at least comprising an electric motor which has at least one stator with at least three coils and one rotor with at least two magnetic poles, an electric circuit and a control device for controlling the electric circuit such that the motor can be operated with a method according to claim 6.

* * * * *

UNITED STATES PATENT AND TRADEMARK OFFICE
CERTIFICATE OF CORRECTION

PATENT NO. : 12,206,351 B2
APPLICATION NO. : 17/921943
DATED : April 27, 2021
INVENTOR(S) : Maurice Andree It is certified that error appears in the above-identified patent and that said Letters Patent is hereby corrected as shown below:

On the Title Page

Item (57), Lines 1-2, "motor having has at" should be --motor has at--.

In the Specification

Column 1, between Lines 9 & 10, should include --The present invention relates to an electric circuit for an electric motor. The electric motor comprises at least one stator and one rotor. In particular, the electric motor is an axial flux motor (AFM).--.

In the Claims

Claim 4, Column 15, Lines 19-20, "to one of the preceding claim" should be --to claim--.

Claim 8, Column 16, Line 4, "on the one hand, the" should be --the--.

Claim 8, Column 16, Line 15, "on the one hand, the" should be --the--.

Signed and Sealed this
Twentieth Day of May, 2025

Coke Morgan Stewart
*Acting Director of the United States Patent and Trademark Office*